(12) United States Patent
Egashira et al.

(10) Patent No.: US 8,450,419 B2
(45) Date of Patent: *May 28, 2013

(54) GOLF BALL MATERIAL, GOLF BALL, AND METHOD FOR PREPARING GOLF BALL MATERIAL

(75) Inventors: Yoshinori Egashira, Chichibu (JP); Eiji Takehana, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 267 days.

This patent is subject to a terminal disclaimer.

(21) Appl. No.: 12/861,937

(22) Filed: Aug. 24, 2010

(65) Prior Publication Data

US 2010/0324172 A1 Dec. 23, 2010

Related U.S. Application Data

(62) Division of application No. 11/488,042, filed on Jul. 18, 2006, now Pat. No. 7,803,874.

(51) Int. Cl.
C08L 33/02 (2006.01)
C08L 75/04 (2006.01)

(52) U.S. Cl.
USPC ........... 525/126; 525/106; 525/119; 525/127; 525/130; 525/154; 525/176; 525/181; 525/183; 525/196; 525/221; 525/330.2; 523/351

(58) Field of Classification Search
None
See application file for complete search history.

(56) References Cited

U.S. PATENT DOCUMENTS

| | | | |
|---|---|---|---|
| 3,819,768 A | 6/1974 | Molitor et al. | |
| 4,215,942 A * | 8/1980 | Seufert et al. | 366/343 |
| 4,774,290 A | 9/1988 | Neill et al. | |
| 4,874,819 A * | 10/1989 | George et al. | 525/185 |
| 4,990,574 A | 2/1991 | Yamada | |
| 5,306,760 A | 4/1994 | Sullivan | |
| 5,312,857 A | 5/1994 | Sullivan | |
| 5,688,868 A * | 11/1997 | Fish, Jr. | 525/183 |
| 5,929,174 A * | 7/1999 | Permentier et al. | 525/330.2 |
| 6,680,082 B2 * | 1/2004 | Chou et al. | 427/220 |
| 7,393,289 B2 | 7/2008 | Egashira et al. | |
| 7,514,505 B2 | 4/2009 | Egashira et al. | |
| 7,635,730 B2 | 12/2009 | Egashira et al. | |
| 8,288,476 B2 * | 10/2012 | Egashira et al. | 525/126 |
| 2001/0020068 A1 * | 9/2001 | Sullivan | 525/196 |
| 2002/0061793 A1 | 5/2002 | Higuchi et al. | |
| 2002/0099120 A1 | 7/2002 | Takesue et al. | |
| 2004/0044136 A1 * | 3/2004 | Kim | 525/192 |
| 2007/0282069 A1 | 12/2007 | Egashira et al. | |
| 2009/0221385 A1 | 9/2009 | Egashira et al. | |
| 2009/0253534 A1 | 10/2009 | Egashira et al. | |
| 2010/0152330 A1 * | 6/2010 | Egashira et al. | 523/351 |
| 2012/0010347 A1 * | 1/2012 | Egashira et al. | 524/432 |
| 2012/0095148 A1 * | 4/2012 | Egashira et al. | 524/432 |

FOREIGN PATENT DOCUMENTS

| | | |
|---|---|---|
| JP | 5-007635 A | 1/1993 |
| JP | 06-287223 A | 10/1994 |
| JP | 6-299052 A | 10/1994 |
| JP | 06287223 * | 10/1994 |
| JP | 06-313075 A | 11/1994 |
| JP | 09-025376 A | 1/1997 |
| JP | 11-276638 A | 10/1999 |
| JP | 2002-539906 A | 11/2002 |
| JP | 2004-091786 A | 3/2004 |
| JP | 2004-352975 A | 12/2004 |
| WO | 98/46671 A1 | 10/1998 |
| WO | 00/57963 | 10/2000 |

OTHER PUBLICATIONS

Rosato, Extruding Plastics; 1998; pp. 75-76.*

* cited by examiner

*Primary Examiner* — David Buttner
(74) *Attorney, Agent, or Firm* — Sughrue Mion, PLLC

(57) ABSTRACT

The invention provides a golf ball material comprising components (A), (B) and (C): (A) a mixture of different masterbatches prepared by separately masterbatching two or more different metal ions (A1) or a masterbatch prepared by simultaneously masterbatching two or more different metal ions in itself (A2), (B) one or more polymer selected from the group consisting of diene polymers, thermoplastic polymers and thermoset polymers, and (C) one or more polymer having an acid content of from about 0.5 to about 30 wt % and selected from the group consisting of olefin-unsaturated carboxylic acid copolymers, olefin-unsaturated carboxylic acid-unsaturated carboxylic acid ester terpolymers, unsaturated carboxylic anhydride-containing polymers, unsaturated dicarboxylic acid-containing polymers and unsaturated dicarboxylic acid half ester-containing polymers. The invention also provides a method for preparing such a golf ball material, and a golf ball made of the material. The golf ball material has a good thermal stability, flow and processability, making it suitable for injection-molding. Moreover, this material is ideal for producing, without any loss of the rebound resilience of golf ball parts molded from the material, high-performance golf balls having excellent durability, scuff resistance and flexibility.

8 Claims, No Drawings

GOLF BALL MATERIAL, GOLF BALL, AND METHOD FOR PREPARING GOLF BALL MATERIAL

CROSS-REFERENCE TO RELATED APPLICATIONS

This is a Divisional of U.S. patent application Ser. No. 11/488,042 filed Jul. 18, 2006, now U.S. Pat. No. 7,803,874. The entire disclosure of the prior application is considered part of the disclosure of the accompanying divisional application, and is hereby incorporated by reference.

BACKGROUND OF THE INVENTION

The present invention relates to golf ball materials which have a good thermal stability, flow and processability and from which there can be obtained high-performance golf balls having excellent properties such as rebound resilience, durability and elasticity. The invention also relates to methods for preparing such golf ball materials, and to golf balls which include as a component therein a molded part made from such a golf ball material.

In recent years, ionomeric resins have been widely used as cover materials for golf balls. Ionomeric resins are ionic copolymers of an olefin such as ethylene with an unsaturated carboxylic acid such as acrylic acid, methacrylic acid or maleic acid, in which some of the acid groups are neutralized with metal ions such as sodium, lithium, zinc or magnesium. These resins provide excellent characteristics in terms of durability, rebound resilience and scuff resistance of the ball.

At present, the base resins used in golf ball cover materials are generally ionomeric resins, but various improvements are being made to cope with the constant desire by players for golf balls having a high rebound resilience and an excellent flight performance.

For example, to improve the rebound resilience and the cost characteristics of ionomer cover materials, U.S. Pat. No. 5,312,857, U.S. Pat. No. 5,306,760 and International Application WO 98/46671 describe cover materials composed of an ionomeric resin to which a large amount of a metallic soap has been added.

However, the metallic soap in these cover materials undergo decomposition and vaporization during injection-molding, generating a large amount of fatty acid gases. As a result, molding defects tend to arise. Moreover, the gases that have formed deposit on the surface of the molded part, markedly lowering its paintability. In addition, depending on the type of metallic soap used, significant declines in processability and rebound resilience sometimes occur, making the cover material entirely unfit for practical use.

In ionomer cover materials, it is a common practice to blend together ionomers containing different metals so as to improve the rebound resilience and durability (e.g., scuff resistance and low-temperature impact resistance), and to use the resulting blend to form golf ball covers. For example, U.S. Pat. No. 3,819,768 describes the mixture of a sodium ionomer of an ethylene-(meth)acrylic acid copolymer with a zinc ionomer of an ethylene-(meth)acrylic acid copolymer to form a golf ball cover material having rebound resilience improved, and the use of the resulting blend in golf ball covers. However, since this is a two-step process in which, first, ionomers of the different metals are prepared, then the respective ionomers are melt-blended together to give the golf cover material, there have been concerns over deterioration in properties due to thermal history through the melt-blending and incomplete blending of both ionomers as well as concerns over increased costs.

An ionomer that has recently been developed for use as a golf ball material is a homogeneous-phase, high-rebound resilience material having an interpenetrating polymer network (IPN) structure (U.S. Published Patent Application No. 2004/0044136). The ionomer is prepared by blending a first component such as an ethylene-(meth)acrylic acid copolymer with a different type of thermoplastic resin as a second component to form a resin composition, then adding as a third component a metal ionic species to neutralize the acid groups in the first component dispersed in the resin composition. However, since the resin material prepared by this method contains only one type of metal ion, there is a concern that the physical properties are inferior to those of resin materials containing a combination of different metal ions. Moreover, since a solid (i.e., a powder or granular material) such as a metal oxide, metal hydroxide or metal carbonate as the metal ionic species is used as it is, and also in case of a high acid content in the first component, the addition of a large amount of the metal ionic species is required for neutralizing the acid groups, during mixing the metal ionic species with the resin components, there are concerns about both poor dispersion of the solid metal ionic species in the resin components and leaving some of the metal ionic species unreacted. In addition, given that a partial neutralization reaction (incomplete degree of neutralization) occurs and that the target degree of neutralization cannot be achieved in a one-step reaction through one-pass extrusion, more than one-pass extrusion be done, which concerns about lowering the physical properties of the resulting ionomer composition.

SUMMARY OF THE INVENTION

It is therefore an object of the invention to provide a golf ball material-preparing method in which, in the coexistence of different metal ions, two or more kinds of neutralization reactions of the acid groups in an acid-containing polymer with different metal ions simultaneously carry out in a single-step reaction (as a one-pass extrusion) to achieve a target degree of neutralization, thereby making it possible to obtain an ionomeric material containing different metal ion crosslinkages (i.e., a mixed metal ionomer). When the ionomeric material is used as a golf ball material, it has a good thermal stability, flow and processability without any loss of rebound resilience, from which a high-performance golf ball having excellent durability and scuff resistance and a suitable hardness can be obtained. A further object of the invention is provide a golf ball which includes as a component therein a molded part made from such a golf ball material.

As a result of extensive investigations, the inventors have discovered that by mixing component A with an acid-containing polymer composition consisting of component B and component C using a twin-screw reaction extruder;

component A is different metal ionic species such as oxygen-containing inorganic metal compounds, either as (A1) two or more separately prepared masterbatches thereof or as (A2) a masterbatch which simultaneously contains two or more different metal ionic species in itself (A1 and A2 are referred to collectively below as "component A"), component (B) is one or more polymers selected from the group consisting of diene polymers, thermoplastic polymers and thermoset polymers, and component (C) is one or more acid-containing polymers having an acid content of between 0.5 and 30 wt % and selected from the group consisting of olefin-unsaturated carboxylic acid copolymers, olefin-unsaturated carboxylic acid-unsaturated carboxylic acid ester terpolymers, unsaturated carboxylic anhydride-containing polymers, unsaturated dicarboxylic acid-containing polymers and unsaturated dicarboxylic acid half ester-containing polymers;

the neutralization reactions of the acid groups in the acid-containing polymer composition consisting of components B and C with component A proceeds smoothly, yielding in a single-step reaction (i.e., in a one-pass extrusion), a material which uniformly contains mixed metal ion crosslinkages. The inventors have also found that this golf ball material has a surprisingly good thermal stability, flow and processability, making it suitable for injection-molding, and that the material is ideal for producing, without any loss in the rebound resilience of golf ball parts molded from the material, high-performance golf balls having excellent durability, scuff resistance and flexibility.

The inventors have also discovered from additional investigations that golf balls consisting of a molded part made from such a golf ball material as a ball component (e.g., a cover material in a two-piece solid golf ball composed of a core and a cover encasing the core, or a cover material or intermediate layer material in a multi-piece solid golf ball composed of a core of at least one layer, at least one intermediate layer encasing the core and at least one cover layer encasing the intermediate layer) exhibit excellent durability, scuff resistance and elasticity without any loss of rebound.

Accordingly, the invention provides the following golf ball material and method for preparing the material and the following golf ball which includes as a component therein a molded part made of such a golf ball material.

[I] A golf ball material composed of the following components:

(A) a masterbatch, that is, a concentrate prepared by separately masterbatching two or more different metal ions (A1) or a masterbatch prepared by simultaneously masterbatching two or more different metal ions (A2);

(B) one or more polymers selected from the group consisting of diene polymers, thermoplastic polymers and thermoset polymers; and (C) one or more polymers having an acid content of from about 0.5 to about 30 wt % and selected from the group consisting of olefin-unsaturated carboxylic acid copolymers, olefin-unsaturated carboxylic acid-unsaturated carboxylic acid ester terpolymers, unsaturated carboxylic anhydride-containing polymers, unsaturated dicarboxylic acid-containing polymers and unsaturated dicarboxylic acid half ester-containing polymers.

[II] A method for preparing a golf ball material composed of above components A, B and C, which includes melt-mixing components B with C to form an acid-containing polymer composition, then melt-mixing component A with the acid-containing polymer composition to carry out the neutralization reactions of the acid groups in the acid-containing polymer composition with component A in a single-step reaction (one-pass extrusion).

[III] A golf ball which includes a part molded from the above golf ball material, and preferably a golf ball wherein the golf ball material is used as a cover material or an intermediate layer material in a two-piece solid golf ball having a core and a cover embracing the core or in a multi-piece solid golf ball having a core of at least one layer, at least one intermediate layer embracing the core, and a cover of at least one layer embracing the intermediate layer.

DETAILED DESCRIPTION OF THE INVENTION

The invention is described below in more detail.

The golf ball material in the invention consists of the essential components A, B and C, each of which is described below in detail.

The inventive method for preparing a golf ball material is a method wherein a material prepared by masterbatching two or more different metal ions is used to carry out the neutralization reactions of the acid groups in an acid-containing polymer composition of components B and C, prepared by melt-blending two or more different types of polymers, in a single-step reaction (one-pass extrusion), thereby obtaining a material having different metal ion crosslinkages.

That is, the present invention was led as the result of an extensive investigation on (A1) a masterbatch, that is, a concentrate prepared by separately masterbatching two or more different metal ions or (A2) a masterbatch prepared by simultaneously masterbatching two or more different metal ions, and on extruders for the acid-neutralizing reaction, particularly twin-screw extruders having arranged therein a special screw segment, so as to carry out the neutralization reactions of the acid groups in the acid-containing polymer composition consisted of components B and C in a single-step reaction (one-pass extrusion).

In the invention, to produce a better golf ball material by carrying out the acid-neutralizing reactions with a combination of different metal ions in a single-step reaction (one-pass extrusion) to obtain a target degree of neutralization, thereby avoiding thermal history associated with both a plurality of extruding passes on the polymer composition to reach a target degree of neutralization and melt-blending different metal ion polymers to get a golf ball material, the masterbatch (A), which refers herein to (A1) two or more masterbatches separately prepared from two or more different metal ions to be used or (A2) a masterbatch simultaneously prepared from two or more different metal ions, is obtained by masterbatching different oxygen-containing inorganic compounds. The different oxygen-containing inorganic metal compounds used for such masterbatch preparations have an average particle size ranging from about 0.005 to about 50 μm, and a particle size distribution in a range of from about 0.001 to about 300 μm. If the average particle size is excessively large, the acid-neutralizing reaction can not proceed to completion. On the other hand, if the average particle size is excessively small, its dispersion during masterbatch preparation becomes poor. As used herein, "average particle size" and "particle size distribution" refer to values obtained by particle size distribution measurement using a laser diffraction technique (laser diffraction/scattering).

Two or more different metal ions are used in the invention. A masterbatch prepared from these metal ions is used as component A. That is, component A is either (A1) a material prepared by separately masterbatching two or more different metal ions (and composed of two or more masterbatches), or (A2) a material prepared by simultaneously masterbatching two or more different metal ions. By using such a masterbatched material (a masterbatch), the different oxygen-containing inorganic metal compounds which are present therein can be uniformly dispersed during the acid-neutralizing reactions in the acid-containing polymer composition consisting of components B and C, thus promoting more uniform reaction with the different metal ions and in turn contributing to uniform properties in the resulting golf ball material containing different metal ion crosslinkages.

When the metal ion sources are not masterbatched, e.g., when two or more different oxygen-containing inorganic metal compounds are mixed directly with components B and C of the above polymer composition, uniformly dispersing the different oxygen-containing inorganic metal compounds in the polymer composition is usually difficult. Undispersed and coagulated powdery masses typically form, resulting in inhomogeneous reactions, which in turn prevents the desired golf ball material properties from being achieved, giving instead a golf ball material that is non-uniform in nature. In particular, if different oxygen-containing inorganic metal compounds are used in the form of coarse powders, undispersed masses remain in the golf ball material. In such cases, by extruding the polymer composition several times, the acid-neutralizing reactions can be completed to the target degree of neutralization. To illustrate, U.S. Published Patent Application No. 2004/0044136 describes an example in which magnesium hydroxide alone is used as the metal ionic species and the acid-containing polymer is passed several times through a twin-screw extruder to promote the neutralization reaction.

The above different metal ions, while not subject to any particular limitation, are typically a combination of a monovalent metal ion with a divalent metal ion, preferred examples of which include Na/Mg, Li/Mg, Na/Zn, Na/Ca and Na/Zn/Ca. The relative proportions of the different metal ions are preferably such that the weight ratio of monovalent metal ions to divalent metal ions is from about 2/98 to about 98/2.

In the practice of the invention, the different oxygen-containing inorganic compounds used in (A1) a material prepared by separately masterbatching two or more different metal ions or (A2) a material prepared by simultaneously masterbatching two or more different metal ions are metal oxides, metal carbonates or metal hydroxides, and the metal ionic species are selected from among groups IA, IB, IIA, IIB, IIIA, IIIB, IVA, IVB, VA, VB, VIIA, VIIB, VIIB and VIIIB of the periodic table. Illustrative, non-limiting, examples of the different oxygen-containing inorganic compounds include lithium carbonate, sodium carbonate, potassium carbonate, magnesium carbonate, zinc carbonate, magnesium hydroxide, magnesium oxide, calcium hydroxide, calcium oxide and zinc oxide. Two or more different compounds are used.

The above oxygen-containing inorganic metal compounds have an average particle size which, while not subject to any particular limitation, is preferably from about 0.005 to about 50 μm, and more preferably from about 0.010 to about 20 μm. The particle size distribution, while not subject to any particular limitation, is preferably from about 0.001 to about 300 μm, and more preferably from about 0.005 to about 100 μm.

Also, by preferentially masterbatching different organic acid-free oxygen-containing inorganic metal compounds which do not release organic acids following the acid-neutralizing reactions, it is possible to promote uniform reactions and to suppress corrosive effects on the manufacturing equipment. Hence, the use of such an approach is preferred.

In such a case, it is advantageous for the base polymer used in the masterbatch of component A to be one having a high melt flow rate (MFR). Specifically, the base polymer is typically one having a melt flow rate of preferably at least about 10 g/10 min, more preferably at least about 50 g/10 min, and even more preferably at least about 100 g/10 min. Use can also be made of a liquid wax such as a high-MFR ethylene wax, or a low-acid, high-MFR ethylene polymer. Illustrative examples include Polyethylene Wax AC5120 (available from Tomen Plastics Corporation; acrylic acid content, 15 wt %; MFR, >1,000 g/10 min), Nucrel 599 (available from DuPont; methacrylic acid content, 10 wt %; MFR, 450 g/10 min), Nucrel 699 (available from DuPont; methacrylic acid content, 11 wt %; MFR, 100 g/10 min), and Nucrel N0200H (available from DuPont; methacrylic acid content, 2 wt %; MFR, 130 g/10 min).

The concentration of the above different oxygen-containing inorganic metal compounds is typically from about 10 to about 90 wt %, preferably from about 20 to about 80 wt %, and more preferably from about 30 to about 70 wt %. If the concentration of the different oxygen-containing inorganic metal compounds in the masterbatch is excessively high, the masterbatch becomes an unacceptably low melt flow rate (MFR) of below 0.1 W10 min. In such a case, when the masterbatch is blended together with the above-described acid-containing polymer composition (components B and C), the different oxygen-containing inorganic metal compounds in the masterbatch can not disperse well. On the other hand, if the concentration is too low, a larger amount of the masterbatch is added, as a result of which the high-MFR thermoplastic resin (particularly ethylene waxes and low-acid, high-MFR ethylene polymers) used in the masterbatch causes a detrimental effect on the physical properties of the golf ball material.

The amount of component A included in the golf ball material is determined by the target degree of neutralization of the acid groups present in the acid-containing polymer composition (components B and C). Excess component A results in a high degree of neutralization, lowering the melt flow rate (MFR) of the golf ball material and thus adversely affecting the processability. On the other hand, the excessively small diminishes the physical properties of the golf ball material and result in a poor rebound resilience and a poor durability in golf balls obtained therefrom.

The method for preparing masterbatches as component A involves the use of an apparatus selected from among twin-screw/single-screw extruders (including kneader-extruders) equipped with a kneader such as a pressurizing kneader and a force feeder, tandem extruders (consisting of a twin-screw extruder for upstream processing and a vacuum-vented extruder for downstream processing), and vacuum-vented twin-screw extruders. It is preferable either to use a twin-screw/single-screw extruder equipped with a kneader and a force feeder or to use a tandem extruder. Using these extruders, the different oxygen-containing inorganic compounds and the base polymer are dry-blended before feeding or are feeded each into the hopper from separate feeders. The mixing temperature is adjusted within a range of about 50 to about 250° C., and preferably about 80 to about 230° C.

The acid-neutralizing reactions of above component A with the acid-containing polymer composition (components B and C) can be effected by mixing the various above components using, for example, an internal mixer such as a twin-screw extruder, a Banbury mixer, a kneader or a Labo Plastomill. The extruder used for preparing the golf ball material is preferably a twin-screw extruder. A twin-screw extruder having features (i) to (v) below is especially preferred.

(i) An effective screw length L/D (i.e., screw length-to-diameter ratio) of 20 or more, preferably 25 or more, and more preferably 30 or more.

(ii) A screw segment configuration in which the L/D ratio of the kneading disc zone is about from 10 to about 90%, preferably from about 20 to about 80%, and more preferably from about 30 to about 70%, of the overall L/D.

Also, the discs in the kneading disc zone of the twin-screw extruder include right-handed kneading discs, left-handed kneading discs, reverse discs, and various neutral discs.

(iii) A screw diameter of 15 mm or more.

(iv) A vent port and a vacuum line connected thereto.

(v) A device for the dropwise addition or pressurized injection of a liquid.

In the single-step acid-neutralizing reaction carried out in the method of the invention with the masterbatch A (component A) of two or more different metal ions (component A), above components B and C are melt-blended to form a molten polymer composition of components B and C. Above component A is then melt-blended into the molten polymer composition, and a liquid may be added (by injection under pressure or dropwise addition) to promote the neutralization reaction in which at least some of the acid groups present in the polymer composition (components B and C) are neutralized. The liquid in this case is preferably a compound shown by the formula ROH, where R represents a hydrogen or an alkyl group. The amount in weight percent of the liquid added versus the resin output (kg) per hour, based on the overall resin extrusion rate, is preferably from about 0.1 to about 10 wt %, more preferably from about 0.5 to about 8 wt %, and even more preferably from about 1.0 to about 5.0 wt %.

The heating conditions (barrel-setting temperatures) can be set to, for example, from 100 to 250° C., although melt-mixing is preferably carried out at a temperature which exceeds both the melting point of component B and the melting point of component C.

Although the mixing method is not subject to any particular limitation, for better microdispersion of component B it is preferable to first thoroughly melt-mix components B and C so as to form the polymer composition of components B and C, then to add and incorporate component A (i.e., component A1 and/or component A2). If additives are to be included, the additives are able to be added and blended into the composition following the incorporation of component A.

In the practice of the invention, the acid-neutralizing reactions of the acid-containing polymer composition (components B and C) with the masterbatched material of two or more different metal ions (component A) is carried out in a single-step reaction. The acid-neutralizing reaction in the twin-screw reaction extruder used for this purpose is carried out at a temperature ranging of from about 110 to about 260° C., preferably from about 130 to about 240° C., and more preferably from about 170 to about 230° C. The extrusion rate (the output) for a screw diameter D of 32 mm is from about 2 to about 60 kg/h, preferably from about 4 to about 40 kg/h, and more preferably from about 5 to about 30 kg/h. Moreover, if the screw diameter ratio $D_1/D_2$ ($D_1$ being larger than $D_2$) is A, the extrusion rate (the output) on scale-up of the twin-screw extruder is proportional to $A^{1.0}$ to $A^{3.0}$ within a range of preferably from $A^{1.0}$ to $A^{3.0}$, and more preferably in an exponential range of from 1.5 to 2.7; i.e., from $A^{1.5}$ to $A^{2.7}$.

It is preferable for the golf ball material of the invention to have a melt flow rate (MFR) within a specific range so as to ensure that it has flow properties well-suited for injection molding and to improve its processability. The melt flow rate is generally at least about 0.1 g/10 min, and preferably at least about 0.5 g/10 min, but generally not more than about 50 g/10 min, and preferably not more than about 30 g/10 min. A melt flow rate which is excessively high or excessively low significantly lowers the processability. As used herein, "melt flow rate" refers to a measured value obtained according to JIS-K7210 at a testing temperature of 190° C. and under a testing load of 21.18 N (2.16 kgf).

The golf ball material of the invention has, in Fourier transform infrared absorption spectroscopic (FT-IR) measurements, an absorption peak attributable to carbonyl stretching vibrations at 1690 to 1710 $cm^{-1}$ and an absorption peak attributable to the carboxylate anion stretching vibrations of a metal carboxylate at 1530 to 1630 $cm^{-1}$, confirming that the acid-neutralizing reactions has taken place and confirming the presence of metal ionic crosslinks.

Molded parts obtained using the golf ball material of the invention have a Shore D hardness of generally at least about 50, and preferably at least about 52, but generally not more than about 75, and preferably not more than about 70. If the molded part has an excessively high Shore D hardness, the "soft feeling" of the ball when hit diminishes significantly. On the other hand, if the Shore D hardness is excessively low, the rebound of the ball decreases.

Component B in the invention is one or more polymers selected from the group consisting of diene polymers, thermoplastic polymers and thermoset polymers. Illustrative examples include polymers and polymer compositions composed of one or more selected from the group consisting of polyolefin elastomers, polystyrene elastomers, polyacrylate polymers, polyamide elastomers, polyurethane elastomers, polyester elastomers, diene polymers, polyacetals (POM), epoxy resins, unsaturated polyester resins, silicone resins and ABS resins.

In the golf ball material of the invention, when component B is a thermoplastic polymer, the acid-containing polymer composition of components B and C has a weight ratio of component B to component C (B/C) of from about 99/1 to about 1/99.

When component B is a thermoset polymer, the weight ratio of component B to component C (B/C) in the acid-containing polymer composition of components B and C is from about 49/51 to about 1/99.

Component C in the inventive golf ball material is a polymer composition which has an acid content of from about 0.5 to about 30 wt %, and preferably from about 1.0 to about 25 wt %, and is one or more selected from the group consisting of olefin-unsaturated carboxylic acid copolymers, olefin-unsaturated carboxylic acid-unsaturated carboxylic acid ester terpolymers, unsaturated carboxylic anhydride-containing polymers, unsaturated dicarboxylic acid-containing polymers and unsaturated dicarboxylic acid half ester-containing polymers.

When component C is an olefin-unsaturated carboxylic acid copolymer, the olefin is generally one having at least 2 carbons, but not more than 8 carbons, and especially not more than 6 carbons. Illustrative examples of such olefins include ethylene, propylene, butene, pentene, hexene, heptene and octene. Ethylene is especially preferred. Illustrative examples of the unsaturated carboxylic acid include acrylic acid, methacrylic acid, maleic acid, maleic anhydride, and fumaric acid. Acrylic acid and methacrylic acid are especially preferred.

When component C is an olefin-unsaturated carboxylic acid-unsaturated carboxylic acid ester terpolymer, the olefin and the unsaturated carboxylic acid are exemplified by the same olefins and unsaturated carboxylic acids as in the above-described olefin-unsaturated carboxylic acid copolymer. The unsaturated carboxylic acid ester is preferably a lower alkyl ester of the above unsaturated carboxylic acids, illustrative examples of which include methyl methacrylate, ethyl methacrylate, propyl methacrylate, butyl methacrylate, methyl acrylate, ethyl acrylate, propyl acrylate and butyl acrylate. The use of butyl acrylate (n-butyl acrylate, isobutyl acrylate) is especially preferred.

When component C is selected from among unsaturated carboxylic anhydride-containing polymers, unsaturated dicarboxylic acid-containing polymers and unsaturated dicarboxylic acid half ester-containing polymers, a polymer composed of an olefin and at least one compound selected from among unsaturated carboxylic anhydrides, unsaturated dicarboxylic acids and unsaturated dicarboxylic acid half esters is preferred. Examples of unsaturated carboxylic anhydrides include maleic anhydride and itaconic anhydride, with maleic anhydride being especially preferred. Examples of unsaturated dicarboxylic acids include maleic acid, fumaric acid and itaconic acid. Examples of unsaturated dicarboxylic acid half esters include monoesters of the foregoing dicarboxylic acids, such as the monoethyl ester of maleic acid, the monomethyl ester of fumaric acid and the monoethyl ester of itaconic acid. The monoethyl ester of maleic acid is especially preferred. The olefin is preferably one having generally at least two carbons, but not more than 8 carbons, and especially not more than 6 carbons. Examples of such olefins include ethylene, propylene, butene, pentene, hexene, heptene and octene. Of these, the use of ethylene is especially preferred.

The unsaturated carboxylic anhydride-containing polymer, unsaturated dicarboxylic acid-containing polymer and unsaturated dicarboxylic acid half ester-containing polymer in above component C are exemplified by, but not limited to, the following polymers:

(i) olefin polymers to which has been grafted an unsaturated carboxylic anhydride, an unsaturated dicarboxylic acid and/or an unsaturated carboxylic acid;

(ii) olefin-unsaturated carboxylic acid polymers to which has been grafted an unsaturated carboxylic anhydride, an unsaturated dicarboxylic acid and/or an unsaturated carboxylic acid;

(iii) olefin-unsaturated carboxylic acid ester polymers to which has been grafted an unsaturated carboxylic anhydride, an unsaturated dicarboxylic acid and/or an unsaturated carboxylic acid;

(iv) olefin-unsaturated carboxylic acid-unsaturated carboxylic acid ester polymers to which has been grafted an unsaturated carboxylic anhydride, an unsaturated dicarboxylic acid and/or an unsaturated carboxylic acid;

(v) olefin-unsaturated carboxylic anhydride-unsaturated carboxylic acid ester polymers;

(vi) olefin-unsaturated dicarboxylic acid-unsaturated carboxylic acid ester polymers; and (vii) olefin-unsaturated dicarboxylic acid half ester-unsaturated carboxylic acid ester polymers.

Each of the above copolymers can be obtained using a known method for copolymerization and grafting. If the acid content within the copolymer is excessively low, the rebound resilience and the strength (tensile strength at break) decrease. If it is excessively high, the processability decreases.

Examples of commercial products that are used as component C include olefin-unsaturated carboxylic acid polymers such as Nucrel 960 and Nucrel 2806 (both products of DuPont), and ESCOR5200, ESCOR5100 and ESCOR5000 (all products of Exxon-Mobil Chemical).

Examples of olefin-unsaturated carboxylic acid-unsaturated carboxylic acid ester polymers include Bynel 2002, Bynel 2014, Bynel 2022 and Bynel E403 (all products of DuPont), and ESCOR ATX325, ESCOR ATX320 and ESCOR ATX310 (all products of Exxon-Mobil Chemical).

Examples of unsaturated carboxylic anhydride polymers include MODIPER A8100, MODIPER A8200 and MODIPER A8400 (all products of NOR Corporation), and LOTADER 3200, LOTADER 3300, LOTADER 5500, LOTADER 6200, LOTADER 7500, LOTADER 8200, LOTADER TX8030 and LOTADER TX8390 (all products of ATOFINA and ARKEMA).

Examples of commercial unsaturated carboxylic anhydride-grafted polymers include Polybond 3009, Polybond 3200 and Royaltough 498 (all products of Uniroyal Chemical), ADOMER NF518 and ADOMER QE800 (both products of Mitsui Chemicals, Inc.), Bynel 2167, Bynel 2174, Bynel 4206, Bynel 4288, Bynel 50E561 and Bynel 50E571 (all products of DuPont), and Exxelor VA1801, Exxelor VA1803, Exxelor VA 1840 and Exxelor PO1020 (all products of Exxon-Mobil Chemical).

In the golf ball material of the invention, by also including a norbornene dicarboxylic anhydride and/or a derivative thereof and a peroxide, together with the above-described essential components A, B and C, followed by carrying out the acid neutralizing reactions together with the grafting reaction of the norbornene dicarboxylic anhydride and/or a derivative thereof onto components B with C, there can be obtained a resin composition having an interpenetrating network (IPN) structure which suppresses delamination by component B. The norbornene dicarboxylic anhydride and/or derivative thereof are exemplified as follows.

Norbornene ring derivatives include halogen-, alkyl-, aryl- and aralkylnorbornenes; and dicarboxylic anhydride derivatives include dicarboxylic acids, dicarboximides and derivatives thereof. Stereoisomers of dicarboxylic anhydrides and their derivatives to the norbornene ring includes the exo isomers, endo isomers and mixtures thereof. Illustrative examples include cis-5-norbornene-endo-2,3-dicarboxylic anhydride, cis-5-norbornene-exo-2,3-dicarboxylic anhydride, methyl-cis-5-norbornene-endo-2,3-dicarboxylic anhydride, cis-5-norbornene-endo-2,3-dicarboximide and 1,4,5,6,7,7-hexachloro-5-norbornene-2,3-dicarboxylic anhydride. These compounds are included in an amount, per 100 parts by weight of above components B and C combined, of generally about 0.05 to about 20 parts by weight, preferably about 0.1 to about 10 parts by weight, and more preferably about 0.2 to about 5.0 parts by weight. If these compounds are added in excess, the resulting resin composition exhibits a drastic decline in melt flow rate (MFR) and causes gel formation, which makes it impossible to obtain normal molded parts. Conversely, if these compounds are added in an excessively small amount, the resulting resin composition causes delamination arisen during injection molding, possibly resulting in a poor scuff resistance and a low rebound, and thus having an adverse influence on the properties of the golf ball obtained as the finished product.

When a norbornene dicarboxylic anhydride and/or a derivative thereof is also included in the golf ball material of the invention, during preparation of the resin composition containing above components A, B and C, a resin composition having an IPN structure can be obtained by melt-mixing components B and C together with the norbornene dicarboxylic anhydride and/or a derivative thereof and a peroxide at a low temperature at which the peroxide does not decompose prematurely, then adding the metal ionic species (e.g., oxygen-containing inorganic metal compounds) of component A and melt-mixing at or above the temperature at which the peroxide decomposes so as to effect both the grafting of the norbornene dicarboxylic anhydride and/or a derivative thereof and the acid-neutralizing reaction. It is preferable here to follow a procedure in which first the norbornene dicarboxylic anhydride and/or a derivative thereof, the peroxide and component B are melt-mixed at a temperature low enough so that the peroxide does not decompose prematurely, then the acid-containing polymer used as component C is melt-mixed at a temperature low enough so that the peroxide does not decompose, following which the metal ionic species (e.g., oxygen-containing inorganic metal compounds) of component A is added and melt-mixing is carried out at or above the temperature at which the peroxide decomposes so as to carry out both the grafting of the norbornene dicarboxylic anhydride and/or a derivative thereof and the acid-neutralizing reaction.

The peroxide used together with the norbornene dicarboxylic anhydride and/or a derivative thereof are selected appropriately based on the decomposition temperature thereof and the melting temperature at which component B and/or component C can be kneaded. The peroxide typically has a 1-minute half-life temperature of from about 140° C. to about 250° C., preferably about 150° C. to about 230° C., and more preferably about 160° C. to about 210° C. Illustrative examples of such peroxides that are utilized include one or more selected from among dicumyl peroxide (1-minute half-life temperature, 175° C.), di-t-butyl peroxide (185° C.), 2,5-dimethyl-2,5-di(t-butylperoxy)-3-hexyne (194° C.), n-butyl-4,4-di(t-butylperoxy)valerate (173° C.), di(2-t-butylperoxyisopropyl)benzene (175° C.), di-t-hexyl peroxide (177° C.) and p-menthanehydroperoxide (200° C.). Of these, the use of dicumyl peroxide, di-t-butyl peroxide and 2,5-dimethyl-2,5-di(t-butylperoxy)-3-hexyne is preferred. It is desirable to set the amount of the peroxide included, based on the combined amount of components B and C, at preferably from about 0.01 to about 20 parts by weight, more preferably from about 0.05 to about 15 parts by weight, even more preferably from about 0.09 to about 10 parts by weight, and most preferably from about 0.1 to about 5.0 parts by weight.

The golf ball material of the invention may additionally include optional additives appropriately for the intended use. When the inventive golf ball material is used as a cover material, various additives such as pigments, dispersants, compatibilizing agents, antioxidants, ultraviolet absorbers and crosslinking agents are added to above components A to C. For example, a norbornene carboxylic anhydride or a derivative thereof may be included as a compatibilizing agent and a peroxide may be included as a crosslinking agent. When such additives are included, they are added in an amount of generally at least about 0.1 part by weight, and preferably at least about 0.5 part by weight, but generally not more than about 20 parts by weight, and preferably not more than about 15 parts by weight, per 100 parts by weight of above components A to C combined.

The golf ball material of the invention has a specific gravity of generally at least about 0.9, preferably at least about 0.92, and more preferably at least about 0.94, but generally not more than about 1.3, preferably not more than about 1.2, and more preferably not more than about 1.05.

The golf ball of the invention includes as an essential ball component a part molded from the above-described golf ball material of the invention. Parts molded from the inventive golf ball material are used as either a portion of the golf ball or the entire golf ball. Examples include the cover of a thread-wound golf ball in which the cover has a single-layer structure or a multilayer structure of two or more layers; a one-piece golf ball; the solid core or the cover of a two-piece solid golf ball; and the solid core, the intermediate layer or the cover of a multi-piece solid golf ball such as a three-piece solid golf ball. The inventive golf ball is not subject to any particular limitation, insofar as it is a golf ball that includes as a ball component therein a part molded from the golf ball material of the invention.

It is particularly advantageous for the golf ball material of the invention to be used as the cover material in a two-piece solid golf ball composed of a core and a cover embracing the core, or as the cover material or the intermediate layer material in a multi-piece solid golf ball composed of a core of at least one layer, at least one intermediate layer embracing the core, and a cover of at least one layer encasing the intermediate layer.

Two-piece solid golf balls composed of a polybutadiene (BR) core and a cover injection-molded from a golf ball material prepared by the above-described method of the invention were manufactured and tested, from which it was found that golf balls having the performances and qualities indicated below can be obtained. Here, golf balls made using cover materials obtained by simultaneous acid-neutralizing reactions involving an oxygen-containing inorganic metal compound masterbatch (A) (examples according to the invention) were compared with golf balls made using, as controls, cover materials obtained from a corresponding melt-blend (comparative examples).

a) Excellently uniform cover's surface.
b) Excellent scuff resistance.
c) Excellent durability (number of shots).
d) High flow properties (MFR).
e) High rebound resilience.
f) Interpenetrating polymer network structure aside from sea-island (salt and pepper) structure.

In the inventive golf ball material and the inventive method of preparation, therefore, by carrying to completion in a single-step reaction (one-pass extrusion) simultaneous neutralization reactions of the acid groups in an acid-containing polymer with a mixture of different masterbatches having a different metal ion source each or a masterbatch having different metal ion sources in itself, is a material containing different metal ion crosslinkages obtained without mixing two or more ionomer materials which are produced respectively to obtain a material as nearly same as the inventive material in an aftertreatment, and has a good thermal stability, flow and processability without any loss of rebound resilience, enabling high-performance golf ball materials of excellent durability, scuff resistance and elasticity to be obtained.

EXAMPLES

Reference Examples and Examples of the invention are given below by way of illustration and not by way of limitation. The twin-screw reaction extruder used in the examples of the invention for the acid-neutralizing reactions had a screw diameter of 32 mm, an overall L/D ratio of 41, an L/D ratio in the kneading disc zone which was 40% of the overall L/D ratio, and was equipped with a vacuum-venting port and a pressured water-injecting device.

Reference Example 1

Preparation of a Magnesium Hydroxide Masterbatch

A 5-liter pressurizing kneader (manufactured by Naniwa Machinery Manufacturing Co., Ltd.; setting temperature, 100° C.) was used to prepare a masterbatch (MB) from an ethylene-methacrylic acid-acrylic acid ester terpolymer (available from DuPont; MFR, 130 g/10 min) as the base polymer and magnesium hydroxide $Mg(OH)_2$ (Kyowa Chemical Industry Co., Ltd.; average particle size, 0.6 μm). The kneader was charged with a combined amount of 2.5 kg of the base polymer and the magnesium hydroxide in a 50/50 weight ratio, and mixing was carried out for 20 minutes under an applied pressure of 0.49 MPa at a rotor speed of 20 rpm and at a mixing temperature controlled to not above 105° C. The mixture was discharged as a strand from a 40 mm-in-diameter twin-screw/single-screw extruder (Naniwa Machinery Manufacturing Co., Ltd.; setting temperature, 170° C.), then passed through a cooling water bath, an air knife, and a pelletizer. The melt flow rate of the resulting magnesium hydroxide masterbatch having a magnesium hydroxide content of 50 wt % was 1.9 g/10 min (measured at 190° C. under a load of 2,160 g). This magnesium hydroxide masterbatch is abbreviated below as "MgMB."

Reference Example 2

Preparation of a Sodium Carbonate Masterbatch

Aside from using sodium carbonate $Na_2CO_3$ (available from Tokuyama Corporation; average particle size of ground material, 5 μn) instead of magnesium hydroxide, the same procedure was done as in Reference Example 1 using the same mixing ratio, i.e., a 50/50 weight ratio between the base polymer and the sodium carbonate. The resulting sodium carbonate masterbatch with a sodium carbonate content of 50 wt % had a melt flow rate of 2.5 g/10 min (at 190° C. under a 2,160 g load). This sodium carbonate master batch is abbreviated below as "NaMB."

Reference Example 3

Preparation of a Mixed Masterbatch

Aside from setting the proportions in which magnesium hydroxide $Mg(OH)_2$ and sodium carbonate $Na_2CO_3$ are mixed to 1.30/3.70 so as to provide the specific degrees of neutralization (mol %) by the respective metal ions shown in Table 1 and using the corresponding amounts of both compounds, the same procedure was conducted as in Reference Example 1. The resulting mixed masterbatch containing 50 wt % of magnesium hydroxide and sodium carbonate had a melt flow rate of 3 g/10 min (measured at 190° C. under a 2,160 g load). This mixed master batch is abbreviated below as "MgNaMB."

Example 1

Using the thermoplastic polyurethane elastomer (TPU) (produced by DIC Bayer Polymer, Ltd. under the trade name Pandex; Shore A hardness, 85) as component B in the invention, and using the ethylene-methacrylic acid copolymer (Polymer 1) (DuPont; MFR, 60 g/10 min), the ethylene-methacrylic acid copolymer (Polymer 2)(DuPont; MFR, 500 g/10 min) and the ethylene-methacrylic acid-isobutyl acrylate terpolymer (Polymer 3) (DuPont; MFR, 31 g/10 min) as component C, melt-mixing was carried out in the proportions shown in Table 1 within a twin-screw reaction extruder set at 160° C. The mixture was extruded as a strand from the extruder die, and passed through a cooling water bath. Excess water was removed with an air knife, then the strand was cut into pellets with a pelletizer, giving a uniform mixed composition of TPU/Polymer 1/Polymer 2/Polymer 3.

Next, pellets of the resulting TPU/Polymer 1/Polymer 2/Polymer 3 mixture were dry-blended in the proportions shown in Table 1 with the NaMB prepared in Reference Example 2 and the MgMB prepared in Reference Example 1. The blend was then fed to the hopper of a twin-screw reaction extruder set at 195° C., and subjected to an acid-neutralizing reactions (to respective levels of neutrality of 40%) at the screw speed of 120 rpm and the extrusion rate (output) of 5.5 kg/hr while injecting water pressured with a liquid injection pump attached to the twin-screw reaction extruder in the amount of 3 wt % with respect to the resin output and while removing volatiles through the vacuum vent. The strand discharged from the extruder die was passed through a cooling water bath, excess water was removed with an air knife, and the strand was cut into pellets with a pelletizer, giving the uniform TPU-containing Na/Mg-ionomer composition. Pellets of the resulting uniform, transparent mixed composition were used to form a 3 mm thick sheet having a length and width of 150 mm each in a hot press compression molding machine. The sheet was visually observed, and found to be free of NaMB and MgMB in unreacted form or as powdery masses.

In addition, titanium dioxide and a blue pigment were dry-blended with this uniform TPU-containing Na/Mg-ionomer composition in the proportions shown in Table 1, then melt-mixed in a twin-screw reaction extruder set at 195° C. at the screw speed of 100 rpm and the extrusion rate (output) of 8.5 kg/hr while using a vacuum vent. The strand discharged from the extruder die was passed through a cooling water bath, following which excess water was removed with an air knife, and the strand was cut into pellets with a pelletizer, yielding the TPU-containing Na/Mg-ionomer golf ball material (TPU-NaMg Ionomer 1). The properties of this golf ball material were evaluated. As shown in Table 1, the golf ball material had a suitable hardness and exhibited a melt flow rate which indicated that it was injection-moldable.

The above golf ball material was employed as the cover material for a two-piece golf ball by being injection-molded over a core of crosslinked polybutadiene (core diameter, 38.9; weight, 36.0 g; compressive strain deflection, 3.35 mm) using an injection molding machine (setting temperatures: hopper, 160° C.; C1 to die head, 180 to 210° C.) at the injection pressure of 5.9 MPa, the holding pressure of 4.9 MPa, the injection and holding time of 8 seconds, and the cooling time of 25 seconds, thereby producing two-piece golf balls. After injection molding, the surface of the golf ball was trimmed, yielding the finished golf balls (diameter, 42.7 mm; weight, 45.5 g) having a smooth surface free of burrs. These golf balls were then evaluated. The results are shown in Table 1, indicating that the golf balls had a good scuff resistance, a good ball durability (see Comparative Examples 1 and 2), a high initial velocity and a high coefficient of restitution (COR). The ball properties were comparable with those obtained in Comparative Example 5 using a corresponding melt-blend, thus confirming the advantageous effects provided by the simultaneous presence of different metal ions.

Example 2

Aside from adding the norbornene dicarboxylic anhydride (α-1) (available from Hitachi Chemical Co., Ltd.; 5-norbornene-2,3-dicarboxylic anhydride) as both the low-molecular-weight compatibilizing agent and the crosslinking agent, and the peroxide (PO) (available from NOR Corporation); 2,5-dimethyl-2,5-di(t-butylperoxy)hexyne-3 in the proportions indicated in Table 1, the same procedure was carried out as in Example 1, giving the uniform TPU-containing Na/Mg-ionomer golf ball material (TPU-NaMg Ionomer 2). This golf ball material and the golf balls made with the material were evaluated. The results are shown in Table 1. The ball properties were comparable with the results obtained in Comparative Example 6 using a corresponding melt blend, thus confirming the advantageous effects provided by the simultaneous presence of different metal ions.

Example 3

Aside from using the ethylene-ethyl acrylate-maleic anhydride terpolymer Polymer 4 (available from ARKEMA;

MFR, 7 g/10 min) instead of Polymer 3 in the proportions indicated in Table 1, the same procedure was carried out as in Example 2, giving the uniform TPU-containing Na/Mg-ionomer golf ball material (TPU-NaMg Ionomer 3). This golf ball material and the golf balls made with the material were evaluated. The results are shown in Table 1. The ball properties were comparable with the results obtained in Comparative Example 7 using the corresponding melt-blend, thus confirming the advantageous effects provided by the simultaneous presence of different metal ions.

Example 4

Aside from using the Na.MgMB prepared in Reference Example 3 in the proportions indicated in Table 1 instead of NaMB and MgMB, the same procedure was carried out as in Example 3, giving the uniform TPU-containing Na/Mg-ionomer golf ball material (TPU-NaMg Ionomer 4). This golf ball material and the golf balls made with the material were evaluated. The results are shown in Table 1. Excellent properties comparable with those in Example 3 were obtained.

Comparative Example 1

The NaMB prepared in Reference Example 2 was used in the mixing proportions indicated in Table 1 to subject Polymer 1 to the acid-neutralizing reactions carried out in Example 1 with the twin-screw reaction extruder, thereby preparing the Na-ionomer component (40 mol % Na-Polymer 1) neutralized to the same degree as the TPU-NaMg Ionomer 1 prepared in Example 1, and the Na Ionomer 1 melt-mixed with titanium oxide and blue pigment was obtained. The resulting golf ball material and the golf balls made with the material were evaluated. The results are shown in Table 1.

With the sodium ionic species alone, the durability and scuff resistance of the golf balls were inferior to those obtained in Example 1 using the combination of different metal ions.

Comparative Example 2

The MgMB prepared in Reference Example 1 was used in the mixing proportions indicated in Table 1 to prepare the TPU-containing Mg-ionomer composition (40 mol % Mg-Polymer 1/Polymer 2/Polymer 3) neutralized to the same degree as the TPU-NaMg Ionomer 1 composition prepared in Example 1, according to the method described in Example 1. The Mg-ionomer composition was assigned as TPU Mg Ionomer 1. The resulting golf ball material and the golf balls made with the material were evaluated. The results are shown in Table 1. With the magnesium ionic species alone, the golf balls had a durability far inferior to that of the golf balls obtained in Example 1.

Comparative Example 3

The TPU, α-1 and the peroxide-containing Mg-ionomer composition (40 mol % Mg-Polymer 1/Polymer 2/Polymer 3) was obtained as TPU-Mg Ionomer 2 by melt-mixing those ingredients in the proportions indicated in Table 1, followed by neutralizing them with the MgMB to the same degree as TPU-NaMg Ionomer 2 composition prepared in Example 2, according to the method described in Example 2. The resulting golf ball material and the golf balls made with the material were evaluated. The results are shown in Table 1. This was the material prepared for melt-blending in Comparative Example 6 serving as the control for Example 2 of the invention. Due to the incorporation of the crosslinkable compatibilizing agent α-1 and the peroxide, the golf ball properties were better than in Comparative Example 2.

Comparative Example 4

The TPU, α-1 and the peroxide-containing Mg-ionomer composition (40 mol % Mg-Polymer 1/Polymer 2/Polymer 3), assigned as TPU-Mg Ionomer 3, was prepared by melt-mixing those ingredients in the proportions indicated in Table 1, followed by neutralizing them with the MgMB according to the method described in Example 3. The resulting golf ball material and the golf balls made of the material were evaluated. The results are shown in Table 1. This was the material prepared for melt-blending in Comparative Example 7 serving as the control for Examples 3 and 4 of the invention. Due to the incorporation of the soft component Polymer 4, the golf ball had a somewhat rough surface after being trimmed.

Comparative Example 5

Control for Example 1

The Na Ionomer 1 prepared in Comparative Example 1 and the TPU-Mg Ionomer 1 prepared in Comparative Example 2 were dry-blended in the proportions indicated in Table 1. Using the same twin-screw reaction extruder as in Example 1, the dry blend was then melt-blended without water injection, at 195° C., with vacuum venting, at the screw speed of 100 rpm and at the extrusion rate (output) of 8.5 kg/hr to give TPU-NaMg Blend 1. The resulting golf ball material and the golf balls made with the material were evaluated. The results are shown in Table 1. Due to the effect of melt-blending different metal ions, a particular improvement in durability over the results obtained in Comparative Examples 1 and 2 was observed.

Comparative Example 6

Control for Example 2

The Na Ionomer 1 prepared in Comparative Example 1 and the TPU-Mg Ionomer 2 prepared in Comparative Example 3 were dry-blended in the proportions indicated in Table 1. The same procedure was followed as in Comparative Example 5 using the same twin-screw reaction extruder as in Example 1, thereby giving TPU-NaMg Blend 2. The resulting golf ball material and the golf balls made with the material were evaluated. The results are shown in Table 1.

Comparative Example 7

Control for Example 3

The Na Ionomer 1 prepared in Comparative Example 1 and the TPU-Mg Ionomer 3 prepared in Comparative Example 4 were dry-blended in the proportions indicated in Table 1. The same procedure was followed as in Comparative Example 5 using the same twin-screw reaction extruder as in Example 1, thereby giving TPU-NaMg Blend 3. The resulting golf ball material and the golf balls made with the material were evaluated. The results are shown in Table 1.

TABLE 1

|  | Example 1 TPU-NaMg Ionomer 1 | Example 2 TPU-NaMg Ionomer 2 | Example 3 TPU-NaMg Ionomer 3 | Example 4 TPU-NaMg Ionomer 4 |
| --- | --- | --- | --- | --- |
| a. Na·MgMB | — | — | — | 9.98 |
| b. NaMB | 7.40 | 7.40 | 7.40 | — |
| c. MgMB | 2.91 | 2.91 | 2.58 | — |
| d. TPU | 20.0 | 20.0 | 20.0 | 20.0 |
| e. a-1 | — | 0.7 | 0.7 | 0.7 |
| f. PO | — | 0.23 | 0.2 | 0.2 |
| g. Polymer 1 | 59.2 | 59.2 | 56.8 | 56.8 |
| h. Polymer 2 | 10.0 | 10.0 | 10.0 | 10.0 |
| i. Polymer 3 | 10.8 | 10.8 | — | — |
| j. Polymer 4 | — | — | 13.2 | 13.2 |
| k. TiO$_2$ | 2.0 | 2.0 | 2.0 | 2.0 |
| l. Blue pigment | 0.04 | 0.04 | 0.03 | 0.03 |
| g'. Polymer 1 | 100 | 100 | 100 | 100 |
| Specific gravity | 0.974 | 0.974 | 0.976 | 0.975 |
| MFR (g/10 min, 190° C.) | 4.2 | 4.0 | 3.3 | 3.2 |
| Hardness (Shore D) | 58 | 59 | 59 | 59 |
| UTS (ultimate tensile strength) (MPa) | 26.8 | 28.8 | 23.6 | 23.4 |
| UTE (ultimate tensile elongation) (%) | 392 | 405 | 373 | 371 |
| Golf ball weight (g) | 45.25 | 45.22 | 45.32 | 45.30 |
| Deflection (mm) | 2.88 | 2.89 | 2.89 | 2.88 |
| Initial velocity (m/sec) | 76.71 | 76.69 | 76.66 | 76.67 |
| Average COR (1$^{st}$ shot to 10$^{th}$ shot) | 0.7721 | 0.7716 | 0.7720 | 0.7721 |
| Shot number (durability) | 175 | 179 | 196 | 194 |
| Scuff resistance | 3 | 3 | 3 | 3 |
| Abrasion resistance | good | good | good | good |
| Golf ball surface after trimming with #1000, 4.5 sec | smooth | smooth | smooth | smooth |

Note:
Numbers shown for ingredients a to l in the table indicate parts by weight.

TABLE 2

|  | Comparative Example 1 Na Ionomer 1 | Comparative Example 2 TPU-Mg Ionomer 1 | Comparative Example 3 TPU-Mg Ionomer 2 | Comparative Example 4 TPU-Mg Ionomer 3 |
| --- | --- | --- | --- | --- |
| b. NaMB | 7.40 | — | — | — |
| c. MgMB | — | 2.91 | 2.91 | 2.58 |
| d. TPU | — | 20.0 | 20.0 | 20.0 |
| e. a-1 | — | — | 0.7 | 0.7 |
| f. PO | — | — | 0.23 | 0.2 |
| g. Polymer 1 | — | 59.2 | 59.2 | 56.8 |
| h. Polymer 2 | — | 10.0 | 10.0 | 10.0 |
| i. Polymer 3 | — | 10.8 | 10.8 | — |
| j. Polymer 4 | — | — | — | 13.2 |
| k. TiO$_2$ | 2.0 | 1.0 | 1.0 | 1.0 |
| l. Blue pigment | 0.03 | 0.03 | 0.02 | 0.02 |
| g'. Polymer 1 | 100 | — | — | — |
| Specific gravity | 0.961 | 0.988 | 0.982 | 0.982 |
| MFR (g/10 min, 190° C.) | 2.6 | 5.1 | 2.3 | 2.3 |
| Hardness (Shore D) | 62 | 57 | 58 | 54 |
| UTS (ultimate tensile strength) (MPa) | 30.6 | 23.1 | 25.5 | 17.6 |
| UTE (ultimate tensile elongation) (%) | 387 | 359 | 388 | 317 |
| Golf ball weight (g) | 45.23 | 45.40 | 43.7 | 43.6 |
| Deflection (mm) | 2.81 | 2.97 | 2.72 | 2.73 |
| Initial velocity (m/sec) | 76.82 | 76.46 | 76.60 | 76.55 |
| Average COR (1$^{st}$ shot to 10$^{th}$ shot) | 0.7746 | 0.7664 | 0.7760 | 0.7754 |
| Shot number (durability) | 122 | 52 | 164 | 167 |
| Scuff resistance | 3 | 3 | 3 | 3 to 4 |
| Abrasion resistance | poor | good | good | good |
| Golf ball surface after trimming with #1000, 4.5 sec | smooth | rough | smooth | less rough |

TABLE 3

|  | Comparative Example 5 TPU-NaMg Blend 1 | Comparative Example 6 TPU-NaMg Blend 2 | Comparative Example 7 TPU-NaMg Blend 3 |
|---|---|---|---|
| Na Ionomer 1 | 50 | 50 | 50 |
| TPU-Mg Ionomer 1 | 50 | | |
| TPU-Mg Ionomer 2 | | 50 | |
| TPU-Mg Ionomer 3 | | | 50 |
| MFR (g/10 min, 190° C.) | 3.9 | 3.6 | 2.3 |
| Hardness (Shore D) | 60 | 60 | 58 |
| UTS (ultimate tensile strength) (Mpa) | 26.9 | 28.6 | 22.1 |
| UTE (ultimate tensile elongation) (%) | 381 | 406 | 364 |
| Deflection (mm) | 2.89 | 2.88 | 2.91 |
| Initial velocity (m/sec) | 76.68 | 76.67 | 76.66 |
| Average COR ($1^{st}$ shot to the $10^{th}$ shot) | 0.7711 | 0.7706 | 0.7702 |
| Shot number (durability) | 171 | 181 | 183 |
| Scuff resistance | 3 | 3 | 3 |
| Abrasion resistance | good | good | good |
| Golf ball surface after trimming with #1000, 4.5 sec | smooth | smooth | smooth |

Note:
The number "50" shown in the table for each ionomer indicates parts by weight.

Ingredient names in above Tables 1 and 2 are explained below.

a. Na.MgMB
  Magnesium hydroxide/sodium carbonate/ethylene-methacrylic acid-isobutyl acrylate terpolymer=13.0/37.0/50 wt %.
b. NaMB
  Sodium carbonate/ethylene-methacrylic acid-isobutyl acrylate terpolymer=50/50 wt %.
c. MgMB
  Magnesium hydroxide/ethylene-methacrylic acid-isobutyl acrylate terpolymer=50/50 wt %.
d. TPU
  Aliphatic polyurethane (HMDI-PCL), produced by DIC-Bayer.
e. α-1
  5-Norbornene-2,3-dicarboxylic anhydride, produced by Hitachi Chemical Co., Ltd.
f. PO
  2,5-Dimethyl-2,5-di(t-butylperoxy)hexyne-3, produced by NOF Corporation.
g. Polymer 1
  Ethylene-methacrylic acid copolymer (MFR, 60 g/10 min), produced by DuPont.
g'. Polymer 1
  Same as g. Polymer 1 appears twice in the tables for convenience in contrasting the examples according to the invention with the comparative examples.
h. Polymer 2
  Ethylene-methacrylic acid copolymer (MFR, 500 g/10 min), produced by DuPont.
i. Polymer 3
  Ethylene-methacrylic acid-isobutyl acrylate (MFR, 31 g/10 min), produced by DuPont.
j. Polymer 4
  Ethylene-ethyl acrylate-maleic anhydride terpolymer (MFR, 7 g/10 min), produced by ARKEMA.
k. $TiO_2$
  Tipaque PF737, produced by Ishihara Sangyo Kaisha.
l. Blue Pigment
  Pigment Blue 29, produced by Toyo Ink.

The tests appearing in the tables are explained below.

MFR (g/10 min)
  The melt flow rate was measured in accordance with JIS-K7210 at a test temperature of 190° C. and a test load of 21.18 N (2.16 kgf).

Shore D Hardness
  The Shore D hardness was measured in accordance with ASTM D-2240.

Tensile Elongation (%), Tensile Strength (MPa)
  The tensile elongation and the tensile strength were measured in accordance with JIS-K7161.

Deflection (mm)
  The golf ball was placed on a steel plate, and the deflection (mm) by the ball when compressed under a final load of 1,275 N (130 kgf) from an initial load of 98 N (10 kgf) was measured. This test was carried out at 23±1° C.

Initial Velocity (m/sec)
  The initial velocity was measured using an initial velocity measuring apparatus of the same type as the USGA drum rotation-type initial velocity instrument approved by the R&A. The ball was held for at least 3 hours at 23±1° C., then tested at the same temperature by being hit with a 250-pound (113.4 kg) head (striking mass) at an impact velocity of 143.8 ft/s (43.83 m/s). Ten balls were each hit twice. The time taken to traverse a distance of 6.28 ft (1.91 m) was measured and used to compute the initial velocity of the ball. This cycle was carried out over a period of about 15 minutes.

Coefficient of Restitution (COR)
  The ball was fired from an air cannon against a steel plate at a velocity of 43 m/s, and the rebound velocity was measured. The coefficient of restitution (COR) is the ratio of the rebound velocity to the initial velocity of the ball. Each value shown in the table is the average of ten measurements.

Shot Number (Durability)
  The durability of the golf ball was evaluated using an ADC Ball COR Durability Tester produced by Automated Design Corporation (U.S.A). A ball was fired using air pressure and made to repeatedly strike two steel plates arranged in parallel. The average number of shots required for the ball to crack was treated as its durability. These average values were obtained by setting four balls of the same type for the testing, repeatedly firing each ball until it cracked, and averaging the number of shots required for each of the balls to crack. The type of tester used was a horizontal COR durability tester, and the incident velocity of the balls on the steel plates was 43 m/s.

Scuff Resistance

The golf balls were held at a temperature of 23±1° C. and hit at a head speed of 33 m/s using a pitching wedge mounted on a swing robot machine, after which damage taken place by the impact was visually rated according to the following scale.

| | |
|---|---|
| Best: | 1 point |
| Better: | 2 points |
| Good (ordinary): | 3 points |
| Poor: | 4 points |
| Poorer: | 5 points |
| Poorest: | 6 points |

Abrasion Resistance

A tubular container having a five-liter volume was filled with 15 golf balls and 1.7 liters of sand, after which the contents were mixed at 50 rpm for 2 hours. The balls were then removed and, based on a visual determination of the extent of surface abrasion and decreased gloss due to abrasion, the abrasion resistance was rated as follows.

Best
Better
Good (ordinary)
Poor
Poorer
Poorest

Ball Appearance after Surface Trimming

The surface of the injection-molded golf ball was trimmed with a #1000 grinding wheel for 4.5 seconds, following which the surface appearance of the ball was rated as follows.

Smooth
Less rough
Rough

The invention claimed is:

1. A method for preparing a golf ball material comprising the following components (A), (B), and (C):
   (A) a mixture of different masterbatches prepared by separately masterbatching two or more different metal ions (A1) or a masterbatch prepared by simultaneously masterbatching two or more different metal ions (A2),
   (B) one or more polymer selected from the group consisting of diene polymers, thermoplastic polymers and thermoset polymers, and
   (C) one or more polymer having an acid content of from about 0.5 to about 30 wt % and selected from the group consisting of olefin-unsaturated carboxylic acid copolymers, olefin-unsaturated carboxylic acid-unsaturated carboxylic acid ester terpolymers, unsaturated carboxylic anhydride-containing polymers, unsaturated dicarboxylic acid-containing polymers and unsaturated dicarboxylic acid half ester-containing polymers, and
   further comprising, in admixture with components A, B and C, a norbornene dicarboxylic anhydride and/or a derivative thereof and a peroxide,
   the method being comprised of melt-mixing components B, C, the norbornene dicarboxylic anhydride and/or a derivative thereof and the peroxide to form a polymer composition, then mixing component A into the polymer composition so as to carry out in a single-step reaction (one-pass extrusion) which neutralizes the acid groups in the acid-containing polymer.

2. The golf ball material-preparing method of claim 1, wherein the acid-neutralizing reactions of the acid groups in the acid-containing polymer composition of components B, C, the norbornene dicarboxylic anhydride and/or a derivative thereof and the peroxide with component A is carried out in a single-step with a twin-screw reaction extruder having arranged therein a screw segment having a kneading disc zone.

3. The golf ball material-preparing method of claim 2, wherein the twin-screw reaction extruder has a length-to-diameter (L/D) ratio of at least 20.

4. The golf ball material-preparing method of claim 2, wherein the screw segment in the twin-screw reaction extruder is arranged to have the kneading disc zone with an L/D ratio ranging from about 10 to about 90% of the overall L/D ratio.

5. The golf ball material-preparing method of claim 2, wherein the twin-screw reaction extruder has a screw diameter of at least 15 mm.

6. The golf ball material-preparing method of claim 2, wherein the twin-screw reaction extruder has a vent port and a vacuum line connected thereto.

7. The golf ball material-preparing method of claim 2, wherein the twin-screw reaction extruder is equipped with a device for the dropwise addition or pressurized injection of a liquid.

8. The golf ball material-preparing method of claim 7, wherein the liquid is a compound shown by the formula ROH (R being hydrogen or an alkyl group) and is added in an amount, based on the resin extrusion rate (the resin output), of 0.1 to 10 wt %.

* * * * *